(12) United States Patent
Lopez

(10) Patent No.: US 6,874,552 B2
(45) Date of Patent: Apr. 5, 2005

(54) TREAD HAVING OFFSET FIRST AND SECOND INCISIONS

(75) Inventor: Jose Merino Lopez, Riom (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 175 days.

(21) Appl. No.: 10/219,719

(22) Filed: Aug. 15, 2002

(65) Prior Publication Data

US 2003/0047263 A1 Mar. 13, 2003

Related U.S. Application Data

(63) Continuation of application No. PCT/EP01/01432, filed on Feb. 9, 2001.

(30) Foreign Application Priority Data

Feb. 17, 2000 (FR) ............................................ 00 02068

(51) Int. Cl.$^7$ .............................................. B60C 11/12
(52) U.S. Cl. ........................... 152/209.17; 152/209.18; 152/209.22; 152/209.23; 152/DIG. 3
(58) Field of Search ....................... 152/209.17, 209.22, 152/209.23, DIG. 3, 209.18

(56) References Cited

U.S. PATENT DOCUMENTS

| 1,455,361 | A | * | 5/1923 | Sipe ...................... 152/209.18 |
| 2,382,068 | A | * | 8/1945 | Kovacs ........................ 157/13 |
| 6,408,910 | B1 | * | 6/2002 | Lagnier et al. ......... 152/209.17 |
| 6,484,772 | B1 | * | 11/2002 | De Labareyre et al. . 152/209.17 |

FOREIGN PATENT DOCUMENTS

| EP | 0858875 | | 8/1998 |
| GB | 511271 | | 8/1939 |
| GB | 515129 | * | 11/1939 |
| JP | 2-246809 | * | 10/1990 |
| JP | 3153406 | | 7/1991 |
| JP | 5-96654 | * | 4/1993 |
| JP | 5-155202 | * | 6/1993 |
| JP | 8-58317 | * | 3/1996 |
| JP | 8058317 | | 3/1996 |
| JP | 9-164817 | * | 6/1997 |
| WO | 9835842 | | 8/1998 |
| WO | 9854009 | | 12/1998 |

OTHER PUBLICATIONS

U.S. Appl. No. 09/021,882, to Garnier et al., filed Feb. 11, 1998.

U.S. Appl. No. 09/364,646, to Labareyre et al., filed Jul. 30, 2002.

U.S. Appl. No. 09/450,255, of Labareyre et al., filed Sep. 24, 2002.

* cited by examiner

*Primary Examiner*—Steven D. Maki
(74) *Attorney, Agent, or Firm*—Burns, Doane, Swecker & Mathis, L.L.P.

(57) ABSTRACT

A tire tread comprising grooves defining motifs in relief, at least one of these motifs being provided with first and second incisions, said incisions each being defined by two main lateral surfaces connected by an end surface, each of the first incisions opening on to the running surface of the tread when new and extending at most as far as the depth, and each of the second incisions extends at least as far as the depth. The tread is characterized in that the bottom surfaces of the first incisions and the apex surfaces of the second incisions are functionally arranged such that, whatever the level of wear the length of the ridges on the running surface is at least equal to 75% of the length of the ridges when new.

14 Claims, 4 Drawing Sheets

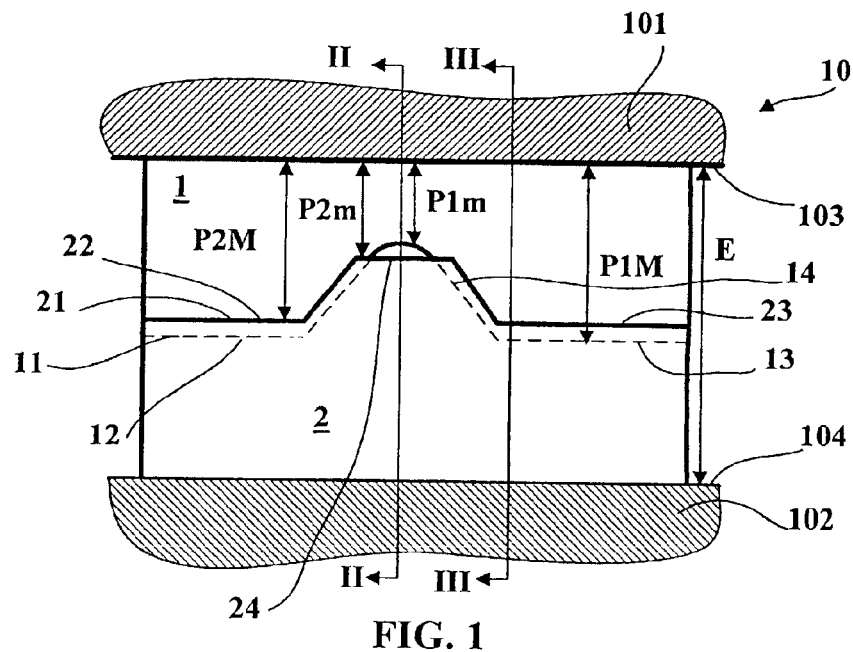
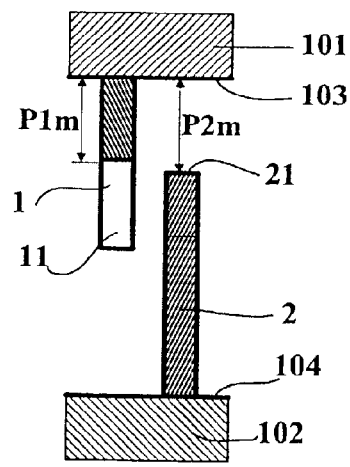
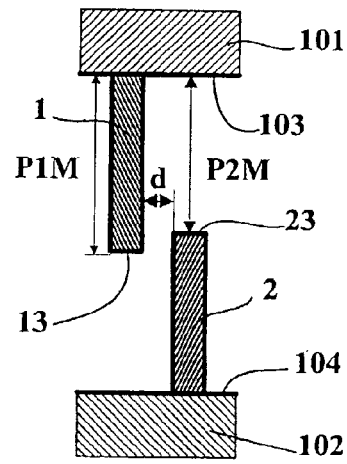
FIG. 1
FIG. 2
FIG. 3

US 6,874,552 B2

TREAD HAVING OFFSET FIRST AND SECOND INCISIONS

CROSS-REFERENCE TO RELATED APPLICATIONS

This application is a continuation application under 35 U.S.C. § 120 of international application Serial No. PCT/EP01/01432, filed Feb. 9, 2001 and published as WO 01/60641 in French on Aug. 23, 2001, which further claims priority to French application Serial No. FR 00/02068 filed Feb. 17, 2000.

BACKGROUND OF THE INVENTION

The invention relates to treads intended in particular to be fitted on tires and more particularly to the tread patterns of these treads. It also relates to moulds for manufacturing these treads.

In order to improve the grip performance during travel of a tire provided with a tread, it is known to provide this tread with motifs in relief, said motifs themselves being provided with incisions in order to increase the number and length of active ridges in the contact area between this tire and the ground. "Incision" is understood to mean grooves of low width relative to the width of the tread (for example, for a heavy-vehicle tire, an incision having a width less than 1.5 mm). When these incisions have depths substantially equal to the thickness of the motifs in relief, it was noted that the more the number of incisions in contact increases, the more the emission of noise during travel increases.

In order to reduce the level of noise emitted during travel of a tire, the tread of which comprises incisions, the depths of which are substantially equal to the depth of the motifs in relief, the Applicant has proposed (see publication WO 98/35842), to effect discrete bridging of said incisions. In the patent application published under the reference EP 858875, there is described a mould for producing a tread provided with such incisions with bridging, this mould comprising two parts, a first part molding the outer face of the tread intended to come into contact with the ground during travel and a second mould part molding the inner face. In the molding configuration, it is stated that a molding element of the first mould part is functionally arranged with a molding element of the second mould part to form one and the same molding element and to define at least one orifice which allows the rubber mix to pass through during molding in order to mould at least one connecting bridge. This mould, although it effectively makes it possible to produce tread patterns comprising incisions and grooves provided with a connecting bridge which provide very good noise results, is costly and difficult to use. It is, in fact, imperative to put the molding elements in place sufficiently precisely on each of the two mould parts in order to effect cooperation of said molding elements.

Furthermore, it is known, for example in application GB 511,271, to produce a tread having a first series and a second series of incisions, the first series being formed of incisions which open on to the running surface of the tread when new and having uniform depths approximately half the height of the motifs in relief of said tread, the second series being formed of incisions which do not open on to the running surface of the tread when new. In order to maintain a good grip performance after partial wear of the tread (affecting the latter over only part of its thickness), the incisions of the second series appear on the new running surface to impart to the tread a grip performance on wet ground which is at least equal to the initial performance. These incisions of the second series which appear on the running surface after partial wear themselves extend over only part of the thickness of the tread or even over the remaining thickness. These incisions are offset longitudinally relative to the incisions of the first series, and may appear on the running surface even before the formers have completely disappeared.

Although it has been noticed that a tread provided with a tread pattern such as described in this latter document had better noise performance compared with the same tread provided with incisions extending over the entire thickness of the motifs in relief, it nevertheless remains that the level of performance obtained is far less than with one and the sane tread pattern provided with a plurality of connecting bridges connecting the main walls of the incisions.

There is a need to obtain a tread pattern which offers satisfactory grip performance whatever the level of wear of this tread and which minimizes the noise emissions during travel of a tire fitted with such a tread when new and also during wear of said tire, while offering the possibility of production by molding which is easy to implement and economic.

SUMMARY OF THE INVENTION

To this end, the tread according to the invention of total thickness E comprises grooves of a depth P which is less than E and defining motifs in relief having thicknesses at most equal to the thickness E; at least one of these motifs is provided with first and second incisions, said incisions each being defined by two main lateral surfaces connected by an end surface, each of the first incisions opening on to the running surface of the tread when new, each of the second incisions being entirely beneath the running surface when new and extending at least as far as the depth P.

This tread is characterized in that:

each first incision has a continuous trace over any surface parallel to the running surface when new between said running surface when new and a minimum depth P1m at most equal to 80% of the maximum depth P1M of said first incision, said depths being measured perpendicular to the running surface when new; this trace being of length L1 at least equal to 75% of the length L0 of the trace of the same first incision on the running surface when new;

the end surface forming the bottom of each first incision extends between the minimum depth P1m and the maximum depth P1M, the total length of the trace of this first incision over any surface parallel to the running surface when new and located at a distance of between P1m and P1M decreasing gradually to be equal to L1M at the depth P1M, this length L1M being at most equal to 75% of the length L1m of the trace of this incision at the depth P1m, each second incision has an end surface which forms the apex of said second incision—corresponding to the surface of the incision connecting the main walls of said incision and located closest to the running surface when new—extending between a minimum depth P2m and a maximum depth P2M, P2m being less than P2M, these depths being measured relative to the running surface when new, and in that with each first incision there is functionally associated at least one second incision such that for the motif in relief in question and in the zone of contact of the tire with the ground, and whatever the level of wear of the tread, the total of the lengths of the traces of the first and second incisions on the running surface is greater than 75% of the length of the traces of the first incisions in contact when the tread is new.

"Length of a trace of an incision opening on to the running surface in the state of wear in question" is understood to mean the average length measured along one of the ridges formed by the intersection of each main wall of said incision with said running surface.

Preferably, the length L1M at the bottom of the incision is at most equal to half the length L1m of the trace of this incision at the depth P1m.

The tread pattern according to the invention makes it possible at the same time to obtain a satisfactory level of grip whatever the level of wear owing to the presence of a sufficient length of ridges, said ridges being formed by the first incisions when new and the first and second incisions after partial wear, and to obtain a low level of noise during travel. It is essential that each first incision between P1m and P1M has its length that decreases substantially and that in combination at least one second incision has a region of overlap to ate for this reduction in length.

Preferably, each second incision has its length over any surface parallel to the running surface when new which increases gradually between P2m and P2M, the amount of increase being proportional to the amount of reduction of length of the first incision with which it is functionally arranged. The length L2m of the trace of each second incision at the depth P2m is for example less than half the length L2M of the same incision at the depth P2M.

In order to produce an effective transition between the first and second incisions, it is advantageous for these incisions to satisfy the following relationship:

$P1m \leq P2m \leq P1M$.

Furthermore, it is advantageous to provide for these same second incisions to satisfy the following relationship:

$P1m \leq P2M \leq P1M$, such that there is partial overlap of the first incisions with the second incisions.

Optimum performance is achieved when the first incisions satisfy the following relationships:

$P1M-P1m \geq E/5$ and, $0.40 \times E \leq P1M+P1m \leq 0.6 \times E$ in which E represents the thickness of the tread corresponding substantially to the total thickness that can be used during travel.

In combination with these ranges of values, it is advantageous for the second incisions to satisfy the following relationships:

$P2M-P2m \geq E/5$ and, $0.40 \times E \leq P2M+P2m \leq 0.60 \times E$

Preferably, the geometries of the end surfaces (bottom or apex) of the first and second incisions form a plurality of undulations. "Undulation" is understood to mean either curved shapes or geometric shapes formed of a succession of broken surfaces (that is to say, surfaces having different inclinations), or alternatively a combination of curved shapes and broken surfaces. These undulations may be combined both in the direction of the thickness of the tread and in a direction perpendicular to this thickness.

The Applicant has furthermore noted that the travelling noise was reduced still further by forming first incisions having in section orientations which are different from the orientations of the second incisions (preferably, the first incisions are substantially perpendicular to the running surface of the tread when new).

The invention also relates to a mould for molding a tread having main outer and inner surfaces connected by lateral surfaces, this tread comprising first and second incisions, the first incisions opening on to the outer surface forming the running surface of the tread when new and the second incisions opening on to the inner surface without opening on to the running surface when new.

To this end, there is proposed a mould for molding a rubber tread, said mould comprising an upper die and a lower die each provided with a molding surface for molding respectively the upper and lower faces of the tread, said dies being intended, when the mould is in the closed position, to define an internal molding volume equivalent to the volume of the rubber tread, the upper and lower dies each comprising at least one lamella, projecting from their molding surfaces, which is/are intended each to form in the rubber tread at least one incision which opens only on to one of the outer and inner surfaces, said lamellae being provided with lateral faces and with end faces joining the lateral faces, one lamella of the upper die being arranged with at least one other lamella of the lower die so as to form an offset d measured in a direction substantially perpendicular to the surface of one of said lamellae.

The mould is characterized in that the end faces of the lamellae of the upper and lower dies have geometries which respectively pass through minima P1m, P2m and maxima P1M, P2M, said minima and maxima being measured relative to the molding surface of the upper die in the closed position of the mould and in that P2M satisfies the following relationship:

$P1m < P2M < P1M$.

Furthermore, the mould according to the invention is such that: $P1m < P2m < P1M$, such that the overlap of the lamellae of the upper die with the lamellae of the lower die is located in a preferred zone relative to the noise performance of a tread molded in a mould such as described.

In the event that there are provided on one and the same motif in relief a plurality of first incisions opening on to the running surface of the tread when new, said first incisions being arranged substantially regularly with a pitch p, it is then advantageous, if d represents the average distance between two incisions, for this distance d between a first incision and a second incision to be between 0.15 and 1.5 times the value of the pitch p.

The tread mould which has been described above can be used to mould a flat, non-continuous tread or alternatively a ring-shaped tread; furthermore, this mould may comprise on its upper die one or more other molding elements for molding grooves defining motifs in relief in the tread.

Of course, the different variants of treads that are described in the present document may be produced by means of a mould according to the invention.

BRIEF DESCRIPTION OF THE DRAWINGS

Other characteristics and advantages of the invention will become apparent from the description given hereafter with reference to the appended drawings, which show, by way of non-limitative examples, forms of embodiment of a mould and a tread pattern which are the subject of the invention.

FIG. 1: partial view of a mould according to the invention;

FIG. 2: sectional view along II—II of the mould of FIG. 1;

FIG. 3: sectional view along III—III of the mould of FIG. 1;

DETAILED DESCRIPTION OF PREFERRED EMBODIMENTS

Figures 4, 5:
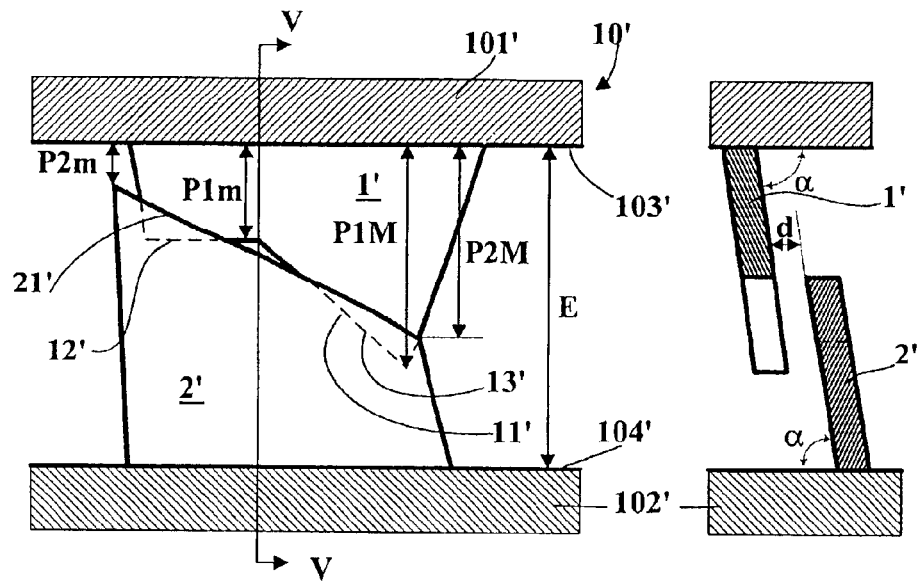
FIG. 4: partial view of a mould variant according to the invention.
FIG. 5: sectional view along V—V of the mould of FIG. 4.

FIG. 1 shows a mould according to the invention in the molding configuration for a tread. In this FIG. 1, the mould 10 comprises an upper mould part 101 and a lower mould part 102, each part being provided with a molding surface, respectively 103 and 104, for molding respectively the outer surface and the inner surface of said tread (the outer surface corresponding to the running surface). A plurality of first lamellae 1 are fixed in the upper part 101 of the mould in order to protrude over the molding surface 103 of this part so as to mould incisions opening on to the running surface of the tread when new. The lamella 1 shown in FIG. 1 is planar in form and of constant width up to a depth P1m and comprises an end part 11, the generatrix of which has in the plane of FIG. 1 a trace which is composed of two parts 12, 13 which are substantially rectilinear and parallel to the trace of the molding surface 103 on the same plane, these two parts 12, 13 being connected by a curved part 14 extending in the direction of the molding surface 103. The trace of the end part 11 of the lamella 1 passes through a minimum distance P1m and through a maximum distance P1M corresponding to the maximum depth of the incision molded by this lamella. The distance P1m is substantially equal to half P1M, whereas P1M is substantially equal to half the distance E between the molding surfaces of the upper and lower parts (the distances P1m and P1M being measured relative to the molding surface 103). In this manner, the lamella 1 permits molding of an incision, the bottom of which is not uniformly at the same depth relative to the running surface of the tread after molding. The lamella 1 moulds an incision, the trace of which on a surface parallel to the surface 103 has two disjointed traces, the total length of which is substantially equal to 75% of the length of the same incision on the running surface when new.

In combination with the first series of lamellae, the second lamellae 2 are fixed in the lower part 102 of the mould 10 to protrude from the molding surface 104 of this part so as to mould incisions which open on to the inner surface of the tread. The lamella 2 shown is of planar shape and is defined by an end wall 21, the trace of which in the plane of FIG. 2 comprises two substantially rectilinear parts 22 and 23 which are connected by a part 24 which extends beyond said two parts in a direction perpendicular to the molding surface 104 of the lower part 102 of the mould. This lamella 2 is intended for molding an incision which opens solely on to the inner surface of the molded tread, the trace of the end part 21 of the lamella 2 passing through a minimum distance P2m and through a maximum distance P2M, which, in the present case, are less than the distance E between the molding surfaces of the upper and lower parts.

There are formed several regions of overlap between the lamella 1 of the outer part 101 and the lamella 2 of the inner part 102, such that after sufficient wear of the tread molded with this mould, the incisions molded by the first lamella 1 and by the second lamella 2 both open on to the running surface. Furthermore, these lamellae satisfy the following three relationships:

$P1m < P2m < P1M$, $P1m < P2M < P1M$, $P2M \approx E/2$.

Each of the first and second lamellae 1 and 2 in the present case is respectively substantially perpendicular to each of the molding surfaces of the lower and upper parts, as can be seen in FIGS. 2 and 3 showing the same mould in section along the lines II—II and III—III; the lamellae 1 and 2 are spaced apart from each other by a distance d which here is substantially equal to the thickness of said lamellae. In order to avoid any joining of the incisions molded by said first and second lamellae ("joining" is understood to mean continuity of the volumes of said incisions), it is necessary for the distance d between a first and a second lamella to be greater than zero.

In the example described, each first and second lamella has a generally planar shape, but it is of course possible to use lamellae of generally curved form; it is also possible to have a first lamella of planar form and a second lamella of undulating form having a plurality of undulations (or alternatively the opposite).

In FIG. 4, another variant of a mould 10' according to the invention is shown in the molding configuration and comprises an upper mould part 101' and a lower mould part 102' which define a molding space of thickness E. The upper part of the mould 101' bears a first lamella 1' of generally planar formula forming an angle α other than 90° with the molding surface 103' of said mould part as can be seen in FIG. 5, which shows a section along the line V—V of the mould of FIG. 4. This lamella 1', which is intended for molding a first incision which opens on to the running surface of a new tread, comprises an end part 11' formed of a part 12' substantially parallel to the running surface extended by a part 13' inclined relative to this surface. The trace 11' of this end face on the plane of FIG. 4 passes through a minimum P1m and a maximum P1M.

In combination with this first lamella 1', the inner mould part 102' bears a second, planar, lamella 2', of the same thickness as said first lamella; this second lamella 2' is parallel to said first lamella 1' so as to be spaced apart from this first lamella by an average distance d substantially equal to the thickness of said lamellae. The second lamella 2' is provided with an end face 21', representing the apex of the incision molded with this second lamella, the trace 21' of which is rectilinear and inclined relative to the molding surface of the outer part, between a minimum P2m and a maximum P2M.

Figure 6:
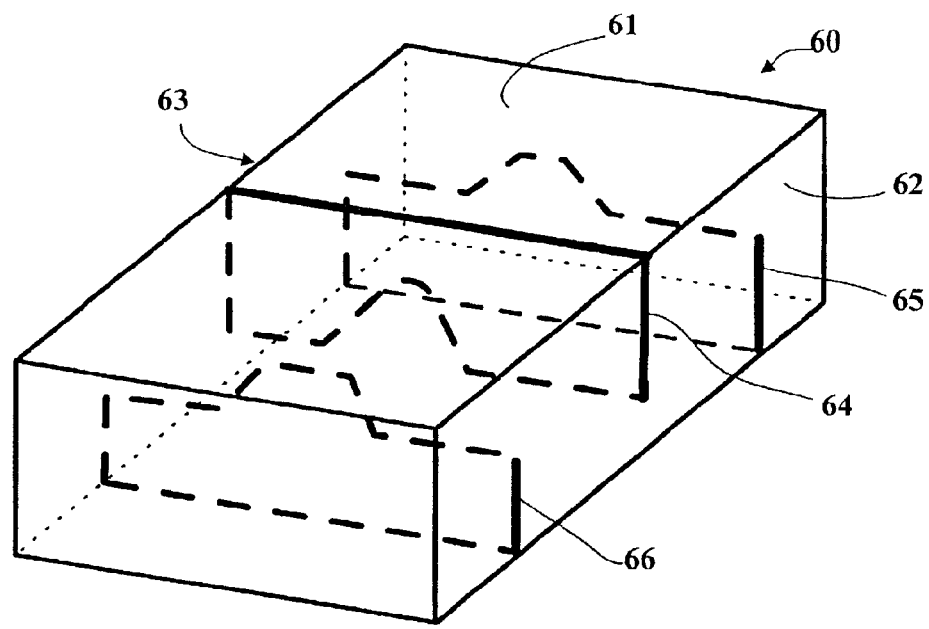
FIG. 6: diagrammatic view of a rubber block of a tread pattern provided with incisions molded with a mould as shown in FIG. 1.

FIG. 6 shows a block of rubber molded with a mould described with reference to FIG. 1. This block 6 is provided with three incisions 64, 65, 66, all three of which open on to two of the lateral faces 62, 63 of said block 6. The intermediate incision 64 opens on to the running surface 61 of the block 6 when new and extends at most over a depth equal to P2M measured relative to said running surface. Combined with this intermediate incision 64, there is molded on either side of said incision 64, an incision 65, 66 which opens on to the inner surface of the molded tread and has the advantage of having regions of overlap with the intermediate incision so as to maintain a length of ridges on the running surface which is substantially twice the length of ridges when new, whatever the level of wear and despite, the gradual disappearance of the intermediate incision with the wear of the tread.

Figure 7:
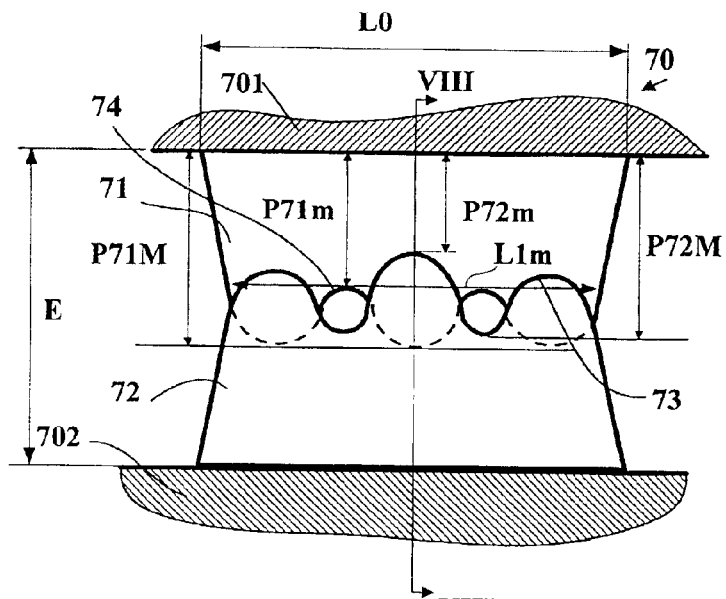
FIG. 7: variant of a mould according to the invention comprising a lamella, the end profile of which is of undulating form.

FIG. 7 shows a partial view of an example of a mould 70 according to the invention comprising a first lamella 71 mounted on an upper mould part 701 and a second lamella 72 mounted on a lower mould part 702. The lamella 71 has, in the plane of this figure, an end surface 74 formed of three undulations substantially of the same amplitude, this end surface 74 extending between a maximum depth P71M and a minimum depth P71m measured relative to the molding surface of the mould part 701 (the minimum depth P71m being equal to 80% of the maximum depth P71M). The lamella 71 has a width L0 over the molding surface of the upper part 701 which corresponds to the length of the trace of the incision molded by this lamella on the running surface of the tread when new. At the depth P71m, the trace of the incision is continuous and of length L1m substantially equal to 80% of L0.

The lamella 72 comprises an end surface 73 having three undulations, the central undulation being of greater amplitude than the other two, this end surface 73 extending between a maximum depth P72M and a minimum depth P72m which are measured relative to the molding surface of the mould part 701. These two lamellae 71 and 72 are offset in the longitudinal direction of the tread to be molded (see FIG. 8 showing a section along the cutting plane VIII—VIII in FIG. 7) so as to mould a first incision and a second incision such that when the first incision begins to disappear on the running surface of the tread after partial wear, the second incision will begin to appear gradually such that the running surface permanently has a length of ridges at least equal to 75% of the length of ridges when new.

Figure 8:
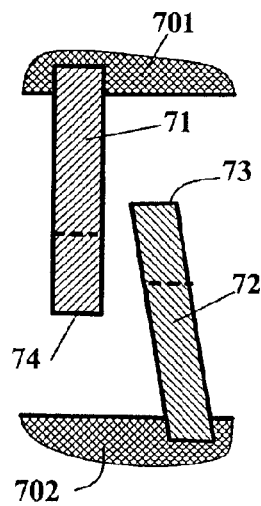
FIG. 8: section along the line VIII—VIII of the mould of FIG. 7.

In FIG. 8, there is shown a partial section through the mould 70 showing the upper part 701 bearing the first lamella 71 and the lower part 702 bearing the second lamella 72 substantially offset relative to each other in the longitudinal direction. The space provided between the first and second lamellae is substantially equal to half the distance between two first lamellae so as to obtain the most homogenous rigidity possible and homogenous operation of the motif in relief that is provided with the incisions molded by the first and second lamellae. The first lamella 71 is perpendicular to the molding surface of the upper part 701, while the second lamella 72 is inclined so as not to be perpendicular to this molding surface.

Figure 9:
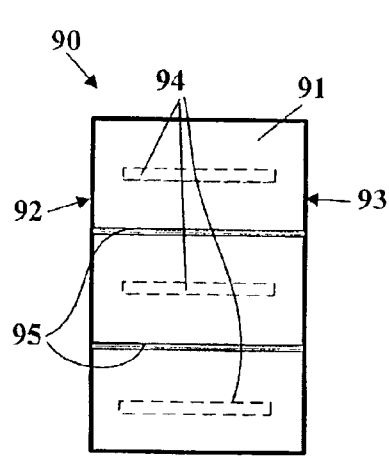
FIG. 9: view of the surface of a rubber block of a tread pattern provided with first incisions and second incisions according to the invention, molded with the mould of FIG. 7.

The Applicant carried out comparative running tests on tires of dimension 315/80 R22.5:
- control T1 comprising a tread pattern provided with incisions opening on to the running surface of the tread when new and being extended over the entire height of the motifs in relief;
- control T2 comprising a tread pattern provided with the same incisions, which themselves are provided with a plurality of connecting bridges connecting the opposite walls of said incisions;
- tire according to the invention (marked with the letter A) comprising the same distribution of motifs in relief, each motif being provided with first and second incisions (see FIG. 9).

These various tires underwent a running test on a heavy vehicle on an ISO track during which the noise emitted by the tires during travel under torque was measured in accordance with the test procedure ISO 362.

FIG. 9 shows the running surface when new of a motif in relief of a tread according to the invention fitted on the tire A. This motif in relief comprises five incisions, two of said incisions opening both on to said running surface and on to two of the lateral walls of said motif. These first two incisions gradually disappear between a minimum depth and a maximum depth substantially equal to half the thickness of said motif. Furthermore, there are provided, at regular intervals in the longitudinal direction of the motif, three other incisions which are interposed with the first two incisions to take over from said first incisions as the motif in relief becomes worn.

For this tire A, we have: E=16 mm; P1m=5 mm; P1M=10 mm; P2m=8 mm; P2M=10 mm.

The distance d between first and second incisions in the longitudinal direction is 7.5 mm. The thickness of the lamellae molding the first and second incisions is: 1 mm.

The table below summarizes the deviations obtained relative to the control T1, the measurements being effected with tires when new:

| | |
|---|---|
| T1 | base |
| T2 | −5 dbA |
| A | −3 dbA |

A positive value indicates degradation, whereas a negative value indicates better performance in terms of noise emitted during travel.

It will be noted that the tread pattern according to the invention makes it possible to achieve a gain which, although not equal to that obtained with the tire T2 which requires a costly mould, is however very significant compared with the control T1. Finally, we should point out that this gain in terms of noise is maintained throughout the use of the tire equipped with a tread provided with such a tread pattern.

Figure 10:
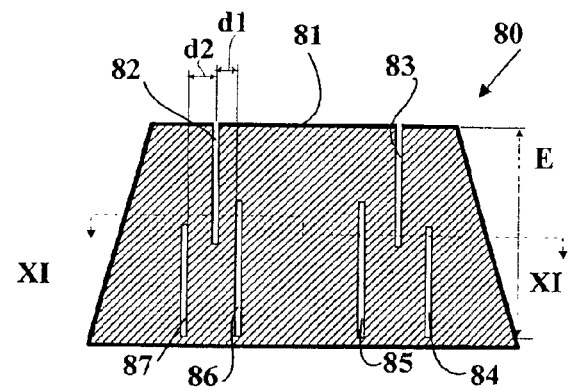
FIG. 10: view in longitudinal section through a variant of a tread pattern block according to the invention.

FIG. 10 shows a rubber block viewed in section. The block 80 comprises two first incisions 82, 83 which open on to the running surface 81 of said block and extend over only part of the thickness E of said block. These first incisions 82, 83 have one and the same geometry and are intended to disappear gradually between a mimimum depth P1m and a maximum depth P1M as the block 80 becomes worn. In combination with each of these first incisions, there are molded two second incisions 84, 85 and 86, 87 which do not open on to the running surface of the block when new. Each of said second incisions is entirely located beneath the running surface when new and is provided to appear gradually between a mimimum depth and a maximum depth; in particular, as the block 80 becomes worn, the second incisions 85, 86, which are located between the first incisions 82, 83, appear on the running surface before the incisions 84, 87 which in turn appear before the first incisions 82, 83 disappear completely.

Figure 11:
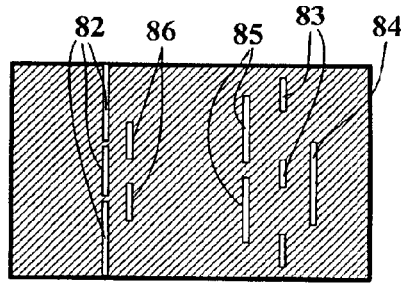
FIG. 11: view in section, along the line XI—XI, of the block shown in FIG. 10.

In FIG. 11, which shows a view in section along a plane XI—XI of the block 80 of FIG. 10, there can be seen on the left-hand part of the drawing what is obtained for a first level of wear of the block: in fact, the incision 82 begins to disappear gradually, its trace on the new running surface being discontinuous, while the incision 86 appears, the discontinuous trace of which is at an average distance d1. The right-hand portion of the same drawing may be viewed as a representation of the same block at a second level of wear subsequent to the first level of wear. In this configuration, the two second incisions 84 and 85 surrounding the first incision 83 have appeared on the running surface, while said first incision 83 has a trace on this running surface which is reduced further compared to what it was in the first state of wear considered.

This latter variant has numerous advantages: the fact of having a larger number of second incisions available which are active only once minimum wear of the block 80 has occurred permits an increase in the flexibility of said block whatever the distance d1, d2 from half-wear onwards, with a significant gain in terms of grip.

Figure 12:
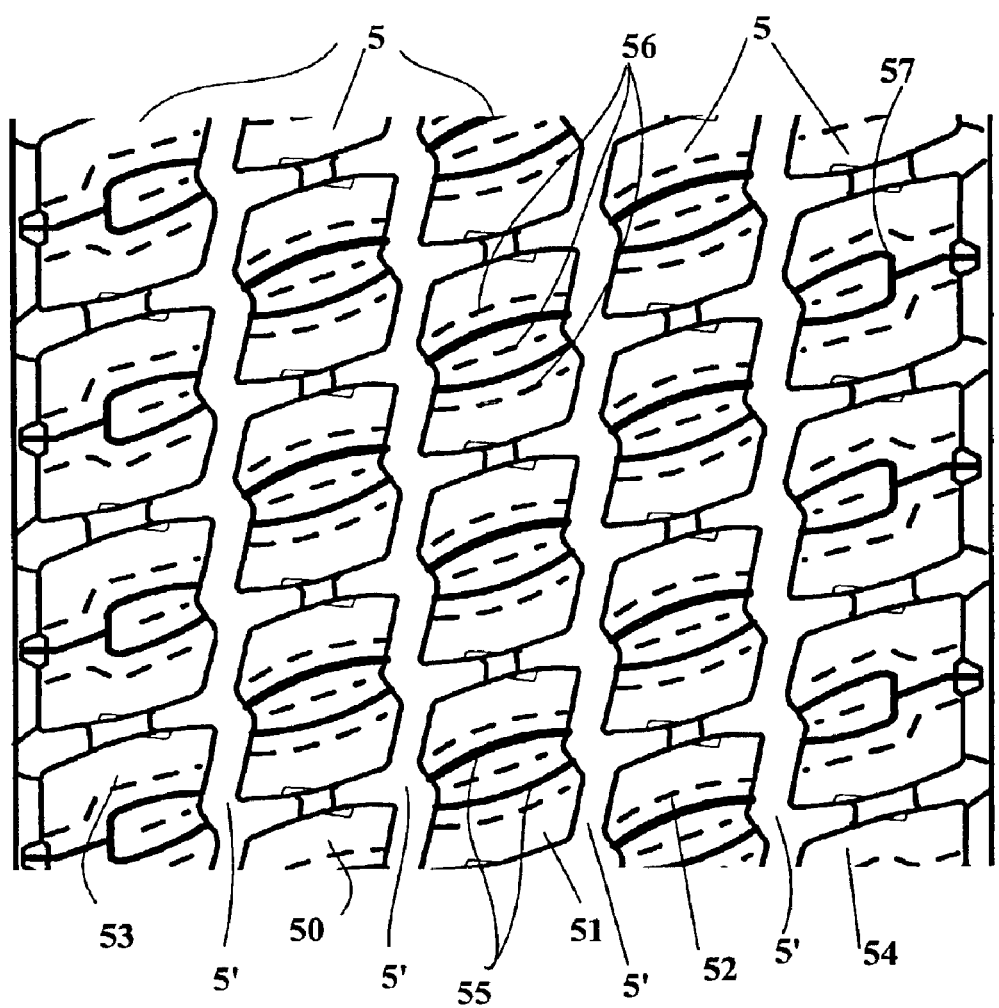
FIG. 12: plan view of a tread pattern according to the invention.

In FIG. 12 there is shown partially the surface of a tread according to the invention comprising five rows 5 of blocks arranged in the circumferential direction of a heavy-vehicle tire and defined by substantially circumferential grooves 5'. The blocks 51, 52, 53 of the central and intermediate rows each comprise when new two incisions 55 which open on to the running surface and on to the lateral walls of said blocks; there are shown in broken lines the traces of three subjacent incisions 56 which are provided to appear after partial wear of the tread has occurred. Substantially the same arrangements are reproduced on the rows of the lateral edges 53, 54 of the tread, with the exception of the initial form of the trace of the first incisions 57 on the running surface when new.

In all the variants illustrated here, it may be advantageous to provide the first incisions opening on to the running surface when new with substantially widened parts closed to the bottoms of said incisions in order to avoid problems of breaking at the bottom of an incision which could cause said first incisions to communicate with the second incisions beneath the running surface and thus create additional running noise. Likewise, the first incisions may advantageously open on to two lateral faces of the motifs in relief as far as the minimum depth P1m to permit lateral evacuation of the trapped air and to reduce further the travelling noise (to the same end, the second incisions may also be provided to open on to the lateral faces of the same motifs).

The examples which have been presented can easily be applied to the case of incisions having more complex geometries, and in particular incisions comprising means for blocking the main walls of said incisions in their movements relative to each other.

I claim:

1. A tread of total thickness comprising grooves of a groove depth at most equal to the thickness defining motifs in relief which are provided with at least two lateral faces, at least one of these motifs being provided with at least one first incision and at least one second incision, said incisions each being defined by two main lateral surfaces connected by an end surface, each first incision opening on to two lateral faces and on to a running surface of the tread when new, each second incision extending at least as far as the groove depth wherein:

each first incision, of a maximum depth, has a continuous trace over any surface parallel to the running surface when new between said running surface when new and a minimum depth at most equal to 80% of the maximum depth of said first incision, said depths being measured perpendicular to the running surface when new, this trace being of a length at least equal to 75% of a length of the trace of the same first incision on the running surface when new, and the end surface forming the bottom of each first incision extends between the minimum depth and the maximum depth, the total length of the trace of this first incision over any surface parallel to the running surface when new and located at a distance of between the minimum depth and the maximum depth decreasing gradually to be equal to a length at the maximum depth, this length at the maximum depth being at most equal to 75% of a length of the trace of this incision at the minimum depth, and, each second incision has an end surface which forms the apex of said second incision—corresponding to the surface of the incision connecting the main walls of said incision and located closest to the running surface when new—extending between a minimum depth of said second incision and a maximum depth of said second incision, the minimum depth of said second incision being less than the maximum depth of said second incision, these depths being measured relative to the running surface when new, and in that with each first incision there is functionally associated at least one second incision such that for the motif in relief in question and in the zone of contact of the tire with the ground, and whatever the level of wear of the tread, the total of the lengths of the traces of the first and second incisions on the running surface is greater than 75% of the total length of the traces of all of the first incisions in contact when the tread is new;

wherein the associated first and second incisions are offset from one another in a direction transversely of the main lateral surfaces by a distance greater than zero and sufficient to prevent joining of the associated first and second incisions during tread wear.

2. A tread according to claim 1, wherein the length of the first incision at the maximum depth is at most equal to 50% of the length of the first incision at the minimum depth.

3. A tread according to claim 2, wherein said second incisions are such that the lengths at the minimum depths of the traces of said second incisions over a surface substantially parallel to the running surface when new which is located at the minimum depth of said second incisions from the latter are less than the lengths of the traces of the same incisions on a surface located at the maximum depth of said second incisions.

4. A tread according to claim 1, wherein the difference between the maximum and minimum depths of the first incisions is greater than or equal to 20% of the total thickness of the tread, and wherein the combination of the maximum and minimum depths of the first incisions is greater than or equal to 40% of the total thickness of the tread and less than or equal to 60% of the total thickness of the tread.

5. A tread according to claim 4, wherein the difference between the maximum and minimum depths of the second incisions is greater than or equal to 20% of the total thickness of the tread, and wherein the combination of the maximum and minimum depths of the second incisions is greater than or equal to 40% of the total thickness of the tread and less than or equal to 60% of the total thickness of the tread.

6. A tread according to claim 1, wherein the minimum depth of the second incisions is greater than the minimum depth of the first incisions and less than the maximum depth of the first incisions, and wherein the maximum depth of the second incisions is greater than the minimum depth of the first incisions and less than the maximum depth of the first incision.

7. A tread according to claim 1, wherein at least one of the second incisions has an inclination other than 90° with the running surface when new.

8. A tread according to claim 1, wherein the first and the second incisions have end surfaces having a plurality of undulations extending in the direction of the length of the traces of said incisions on the running surface.

9. A tread according to claim 1, wherein in the contact the number of second incisions which do not open on to the running surface when new is greater than the number of first incisions which open on to the same surface.

10. A tread according to claim 1, wherein the first incisions open on to two lateral faces of the motifs in relief as far as the minimum depth of the first incision.

11. A tire fitted with a tread according to claim 1, intended to be fitted on an axle of a heavy vehicle.

12. A tread according to claim 1 wherein the distance between the associated first and second incisions is substantially one-half of a distance between adjacently disposed first incisions.

13. A tread according to claim 1 wherein a distance between adjacently disposed first incisions defines a pitch; the distance between associated first and second incisions being between 0.15 and 1.5 times the pitch.

14. A tread according to claim 1 wherein, disposed between the maximum and minimum depths of the first incision of each pair of associated first and second incisions, there is a region of the tread where the associated first and second incisions overlap in the direction of tread thickness, and where during tread wear, the trace of first incision gradually decreases while the trace of the second incision simultaneously gradually increases.

* * * * *